2,774,736
METHOD OF APPLYING METAL AND METAL VAPOR DECONTAMINANTS

William M. Stieh, Teaneck, N. J., assignor to William M. Stieh & Co., Inc., Teaneck, N. J., a corporation of New Jersey No Drawing. Original application December 5, 1950, Serial No. 199,371. Divided and this application September 21, 1953, Serial No. 381,504

4 Claims. (Cl. 252—192)

This invention relates to metal and metal vapor decontaminants, specifically compositions for use in connection with the handling of metals and their salts, such as mercury, and the method of applying said decontaminants, and is a division of an application for patent entitled: Compositions for Decontaminating Metal and Metal Vapors and Method of Applying, Serial No. 199,371, filed December 5, 1950, now abandoned.

In the fabrication and handling of certain metals, it becomes necessary, for the protection of the workers, to neutralize the amount of poisonous vapors contained in the air and upon all surfaces which may become contaminated with the said metal.

Accordingly, it is an object of the present invention to provide a chemical composition which when applied will form a coating on the poisonous metals, and react with the various salts, such as mercury salts, to produce a non-vaporizing form, and reduce the metal vapor content of the contaminated air.

Another object of the present invention is to provide a composition in the nature of a wax, which may be applied to floors, walls, and other surfaces, so as to decontaminate the metal thereon.

A further object of the present invention is to provide an air decontaminator in the nature of a scrubber, which will remove the poisonous vapor from the air, so as to render it more healthful.

It has been found that when air or surfaces which have been contaminated by metals, such as mercury, cadmium, lead, etc., are treated with a mixture of ethylenediamine tetra acetic acid, and sodium thiosulphate, mixed with water, the danger from poisoning through contact with said air or contaminated surfaces is eliminated.

Suitable results may be obtained by employing between 5% and 20% of ethylenediamine tetra acetic acid, mixed with 80% to 95% of sodium thiosulphate. The mixture is then dissolved in water employing one pound of the mixture to five gallons of water. The solution may then be applied to the exposed surfaces as a wash, by spraying, or in a wax base, so as to come in contact with the metal vapor particles.

It is also within the purview of the present invention to moisten sawdust with the solution and sprinkle it upon the floor of working areas, before sweeping.

A further use of the preferred solution is to pump contaminated air through a tank containing the solution, thereby neutralizing the dangerous metals, dusts and vapors, contained in the said air.

It is also possible to provide large screens of a liquid absorbent substance containing the preferred solution within an air conditioning unit, installed within the working area, thereby causing the possible contamination to be removed in the process of circulating the air through the air conditioning unit.

Highly satisfactory results have been achieved with the following formula:

|   | Percent |
|---|---|
| Ethylenediamine tetra acetic acid | 10 |
| Sodium thiosulphate | 90 |
| Water. | |

The ethylenediamine tetra acetic acid and sodium thiosulphate are slowly added to water in proportion of 1 pound to five gallons of water to form a milky solution. Thereafter, the milky solution may be applied with a sprayer, large white wash brush, or mop, to the contaminated surfaces, and allowed to stand overnight.

A similar treatment carried on every two weeks in operating areas which are exposed to metal contamination, provides a coating or film upon the metal particles, for reducing the metal to a non-vaporizing form, so as to make the area safe. However, in experiments conducted with untreated globules of mercury, air taken one-half inch above the contaminated area, showed 0.3 mg. per cubic meter of air, which is three times over the safe limits.

Sixty days following the above-mentioned treatment with the prepared solution, air taken-one-half inch above the contaminated area showed 0.02 mg. per cubic meter of air, or one-fifth of the accepted safe limits for mercury vapor.

From the foregoing, it will be seen that a composition and method have been provided which will eliminate the hazard to persons working under conditions susceptible of metal contamination, whereby the metal may be rendered harmless, so as to protect the health of such persons.

Having thus fully described the invention, what is claimed as new and desired to be secured by Letters Patent of the United States, is:

1. The method of decontaminating an area exposed to metallic mercury which consists of the steps of mixing at least 5% and not more than 20% of ethylene diamine tetra acetic acid with at least 80% and not more than 95% of sodium thiosulphate, slowly dissolving the mixture in water to form a milky solution, applying the said solution in the form of a wash to the contaminated surfaces and allowing the said solution to dry in contact with the metallic mercury.

2. The method of decontaminating air exposed to metallic mercury vapor which consists of the steps of mixing at least 5% and not more than 20% of ethylene diamine tetra acetic acid with at least 80% and not more than 95% of sodium thiosulphate, slowly dissolving the mixture in water to form a milky solution and thereafter forcing the metal contaminated air through the said solution.

3. The method of decontaminating an area exposed to metallic mercury which consists of the steps of mixing at least 5% and not more than 20% of ethylene diamine tetra acetic acid with at least 80% and not more than 95% of sodium thiosulphate and water in a wax base, and thereafter applying the wax to surfaces in the contaminated areas.

4. The method of decontaminating an area exposed to metallic mercury which consists of the steps of mixing at least 5% and not more than 20% of ethylene diamine tetra acetic acid with at least 80% and not more than 95% of sodium thiosulphate, slowly dissolving the mixture in water to form a milky aqueous solution, impregnating saw dust with said solution and spreading said impregnated saw dust on the contaminated area.

References Cited in the file of this patent

UNITED STATES PATENTS

| | | |
|---|---|---|
| 1,589,428 | Rosenow | June 22, 1926 |
| 2,170,993 | Grady | Aug. 29, 1939 |
| 2,257,186 | Orthner | Sept. 30, 1941 |
| 2,300,965 | Randall | Nov. 3, 1942 |
| 2,430,861 | Carpenter | Nov. 18, 1947 |

FOREIGN PATENTS

| | | |
|---|---|---|
| 344,841 | Great Britain | Sept. 9, 1929 |

OTHER REFERENCES

Ephraim Inorganic Chemistry, 4th ed., rev. by Thorne et al., pp. 554–595. Nordeman Pub. Co., Inc., New York, N. Y. (1943).

Versene: The Modern Chelating Agent, Bersworth Chemical Co., Framingham, Mass. Technical Bulletin No. 1, 1949, pp. 1, 2, and 7.